United States Patent [19]
Vollmann

[11] Patent Number: 6,016,236
[45] Date of Patent: *Jan. 18, 2000

[54] APPARATUS FOR THE STORAGE AND/OR REPRODUCTION OF INFORMATION ON/FROM AN INFORMATION CARRIER

[75] Inventor: Norbert C. Vollmann, Eindhoven, Netherlands

[73] Assignee: OnStream, Inc., Loveland, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/895,254

[22] Filed: Jul. 16, 1997

[30] Foreign Application Priority Data

Oct. 21, 1996 [EP] European Pat. Off. .............. 96202935

[51] Int. Cl.⁷ .................................................. G11B 15/675
[52] U.S. Cl. ............................................................ 360/96.5
[58] Field of Search ................................. 369/75.2, 75.1, 369/36, 178, 77.1, 77.2; 360/99.02, 99.03, 99.06, 99.07, 96.5

[56] References Cited

U.S. PATENT DOCUMENTS

| | | | |
|---|---|---|---|
| 4,891,513 | 1/1990 | Okita et al. | 250/239 |
| 4,945,433 | 7/1990 | Suzuki et al. | 360/99.07 |
| 5,195,078 | 3/1993 | Ikedo et al. | 369/75.2 |
| 5,517,473 | 5/1996 | Permut | 369/36 |

*Primary Examiner*—Stuart S. Levy
*Assistant Examiner*—Kenneth W Fields
*Attorney, Agent, or Firm*—Welsh & Katz, Ltd.

[57] ABSTRACT

The invention relates to an apparatus for the storage and/or reproduction of information on/from an information carrier accommodated in a cartridge. The apparatus comprises a motorized loader for the motorized loading of a cartridge. The apparatus has a mechanism by means of which the cartridge can be pulled into the apparatus with a first transmission ratio and is subsequently moved into an operational position with a second transmission ratio. The mechanism is based on the fact that the motorized loading mechanism comprises an element having two contact surfaces which are disposed at an angle relative to one another.

20 Claims, 4 Drawing Sheets

APPARATUS FOR THE STORAGE AND/OR REPRODUCTION OF INFORMATION ON/FROM AN INFORMATION CARRIER

BACKGROUND OF THE INVENTION

1. Field of the Invention

The invention relates to an apparatus for the storage and/or reproduction of information on/from an information carrier accommodated in a cartridge, which apparatus comprises a chassis, a drive member for driving the information carrier via a drivable member of the cartridge, a cartridge space for receiving a cartridge, which cartridge space is accessible via an opening in a wall of the apparatus, a movable gripper arranged in the cartridge space and adapted to grip the cartridge, and a loading mechanism comprising an electric motor and a wheel drivable by the motor, which wheel has a first contact surface which cooperates with a second contact surface which forms part of an element for moving the gripper linearly in an inward direction from a loading position, in which the cartridge can be inserted, into an operational position, in which the information carrier can cooperate with the drive member, and for moving the gripper in an outward direction from the operational position to the loading position.

2. Description of Related Art

Such an apparatus is known from EP 0 638 898. The known apparatus is a write/read unit for recording and reading 3½ inch tape cartridges. The known apparatus comprises a motorized loading mechanism by means of which a cartridge which has been inserted by hand can be pulled into the apparatus. The apparatus has a chassis and a cartridge gripper which is movable relative to the chassis and which carries two coupling members which are engageable in a cartridge. An electric motor is mounted on the chassis to drive a shaft via a worm gear, which shaft extends over the width of the apparatus. Two gear wheels mounted near the ends of the shaft mesh with two gear racks connected to the cartridge gripper. By energizing the motor the cartridge gripper can be moved from a loading position to an operational position. A disadvantage of the known apparatus is that the loading mechanism occupies much space. Another disadvantage is that a cartridge cannot be removed from the apparatus if the motor does not function.

SUMMARY OF THE INVENTION

It is an object of the invention to provide an apparatus of the type defined in the opening paragraph, in the loading mechanism occupies less space than in the known apparatus. To this end, the apparatus in accordance with the invention is characterized in that the second contact surface comprises a first part which extends in the inward direction and a second part which extends at an angle between 45 and 90 degrees relative to the inward direction. These measures result in a first transmission ratio between one revolution of the motor shaft and the movement of the gripper when the wheel driven by the motor cooperates with the first part of the second contact surface and a second transmission ratio when the wheel cooperates with the second part of the second contact surface. As a result, the cartridge is first moved from the loading position into the apparatus with a comparatively high speed and subsequently the cartridge is moved into the operational position with a comparatively low speed. The cartridge is moved with greater power with the second transmission ratio. This is important because a drivable member of the cartridge should be pressed with some force against the drive member of the apparatus by means of the loading mechanism in order to ensure a proper coupling between said members. The different transmission ratios enable a comparatively small motor to be used, as a result of which the loading mechanism requires a comparatively small space. The measures in accordance with the invention are also advantageous because the cartridge is brought into the operational position more accurately owing to these measures.

An embodiment of the apparatus in accordance with the invention is characterized in that the apparatus comprises coupling means adapted to couple the element pivotably to the chassis or the gripper. As a result of this measure the motor and the wheel which can be driven by the motor can have a fixed position on the gripper or the chassis while the gripper performs a linear movement between the loading position and the operational position.

An embodiment of the apparatus in accordance with the invention is characterized in that the element comprises a third contact surface having a third part which extends in the inward direction and having a fourth part which extends at an angle between 45 and 90 degrees relative to the inward direction, and the gripper comprises a fourth contact surface which cooperates with the third contact surface. Preferably, the gripper or the chassis carries a pin which cooperates with a surface bounding a slot in the element. As a result of this, the first and the second contact surface are also kept in engagement when the element is pivotably mounted. Moreover, such a pin enables a large force to be exerted on the gripper without any large normal forces being exerted on the first and the second contact surface. This is desirable because, for example, teeth on the first and the second contact surface can be damaged by large normal forces.

An embodiment of the apparatus in accordance with the invention is characterized in that said angles lie between 60 and 70 degrees. This makes the loading mechanism self-braking without seizing. As a result of this, a worm gear transmission is not needed, so that the loading mechanism requires less space.

An embodiment of the apparatus in accordance with the invention is characterized in that the first contact surface has first teeth, the second contact surface has second teeth and the first teeth are in mesh with the second teeth. A toothed transmission is advantageous because it enables larger forces to be transmitted than, for example, a frictional transmission.

An embodiment of the apparatus in accordance with the invention is characterized in that the electric motor is mounted on the gripper and the element is coupled to the chassis. In the apparatus known from, for example, EP 0 638 898 the motor is so large that mounting this motor on the gripper would meet with substantial practical problems. The measures in accordance with the invention enable a small motor to be used, as a result of which it is not a problem to mount the motor on the gripper. By mounting the motor on the gripper it is also achieved that a small overall height and a small overall depth in the inward direction are obtained.

An embodiment of the apparatus in accordance with the invention is characterized in that the apparatus comprises an unloading mechanism adapted to move the gripper in an outward direction from the operational position to the loading position without the motor being energized and the unloading mechanism comprises coupling means adapted to selectively couple the element and the chassis. As a result of these measures, a cartridge can simply be removed from the apparatus in the event of a fault. By disengaging the element from the chassis and moving the element in the outward direction the gripper and the cartridge are moved in the outward direction, after which the cartridge can be removed from the gripper by hand. The first and the second contact surface then do not move relative to one another, so that no mechanism is required to disengage the contact surfaces from one another. Moreover, this construction requires little space. In addition, the measures in accordance with the invention always allow the gripper to be moved back to the loading position regardless of the distance between the loading position and the operational position.

An embodiment of the apparatus in accordance with the invention is characterized in that the coupling means comprise a slide, which slide has a guide surface which cooperates with the element to move the element from a position in which the element is locked against movement in the outward direction relative to the chassis to a position in which the element is movable in the outward direction, and the apparatus comprises a handle for actuating the slide. These measures enable the element to be disengaged from the chassis by simply pulling the handle, as a result of which the snap coupling is released. After this, the gripper can be moved to the loading position by pulling the handle further away from the apparatus. Owing to these measures the cartridge can be removed from the apparatus in one movement.

The invention also relates to a system for recording and/or reproducing information, comprising an apparatus in accordance with the invention and a cartridge which accommodates an information carrier.

BRIEF DESCRIPTION OF THE DRAWINGS

The invention will now be described in more detail, by way of example, with reference to the drawings, in which.

DETAILED DESCRIPTION OF THE PREFERRED EMBODIMENTS

Figure 1:
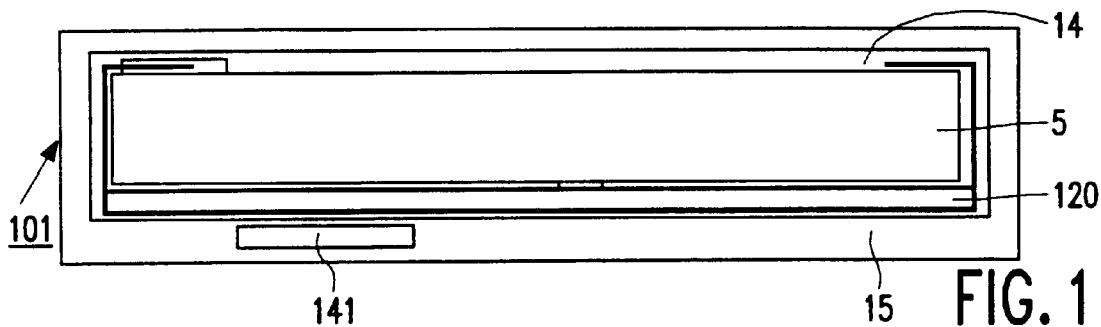
FIG. 1 is a front view of an embodiment of the apparatus in accordance with the invention.

FIG. 1 is a front view of the apparatus in accordance with the invention in the form of a 3½ inch tape drive 101. A tape cartridge 5 has been inserted into the apparatus 101 via an opening 14 in the front wall 15. The cartridge 5 is held in the apparatus by a gripper 120.

Figure 2:
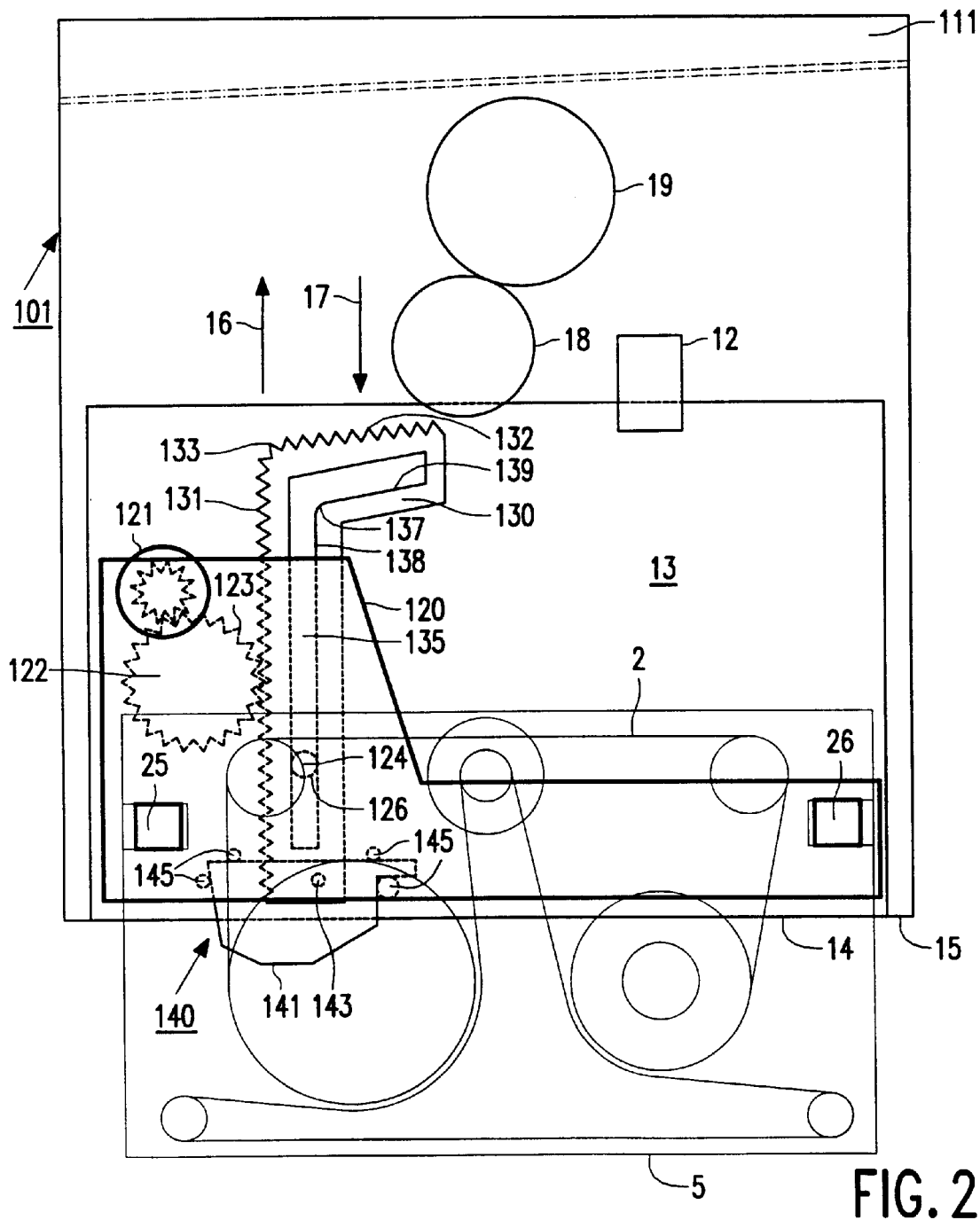
FIG. 2 is a diagrammatic plan view of an embodiment of the apparatus in accordance with the invention, a gripper of the apparatus being shown in a loading position.

FIG. 2 is a diagrammatic plan view of the apparatus 101. The apparatus 101 is a recorder for recording information on a magnetic tape 2 accommodated in the cartridge 5. The apparatus 101 has a cartridge space 13 for receiving the cartridge 5 and the gripper 120 for gripping a cartridge inserted into the apparatus through the opening 14 in the wall 15 (see FIG. 1). To retain the cartridge 5 the gripper 120 has two resilient projections 25 and 26 which cooperate with recesses in the cartridge 5. The apparatus 101 further comprises a magnetic head 12, a drive roller 18 and a drive motor 19 mounted on a chassis 111. The gripper 120 is movable from a loading position (see FIG. 2) into an operational position (see FIG. 3) by means of a loading mechanism. This loading mechanism comprises an electric motor 121 and a wheel 122 drivable by the motor, which are both secured to the gripper 120. The wheel 122 has a first contact surface, in the present case a toothed surface 123, which cooperates with a second contact surface in the form of a toothed surface 133. The toothed surface 133 forms part of an element 130 coupled to the chassis 111. When the motor 121 is energized the toothed surface 123 will interact with the toothed surface 133 and a force will be produced by which the gripper 120 is moved relative to the chassis 111. The element 130 is pivotably coupled to a handle 141 via a pin coupling 143. The handle 141 is coupled to a chassis 111 via a snap coupling. The snap coupling comprises pins 145 which are mounted on the chassis 111 and between which the handle 141 is clamped so as to be detachable. The gripper 120 has a pin 124, which engages in a slot 135 of the element 130. The pin 124 ensures that the toothed surface 123 and the toothed surface 133 remain in mesh with each other in spite of the fact that the element 130 is pivotably coupled to the chassis 111 via the handle.

Figure 3:
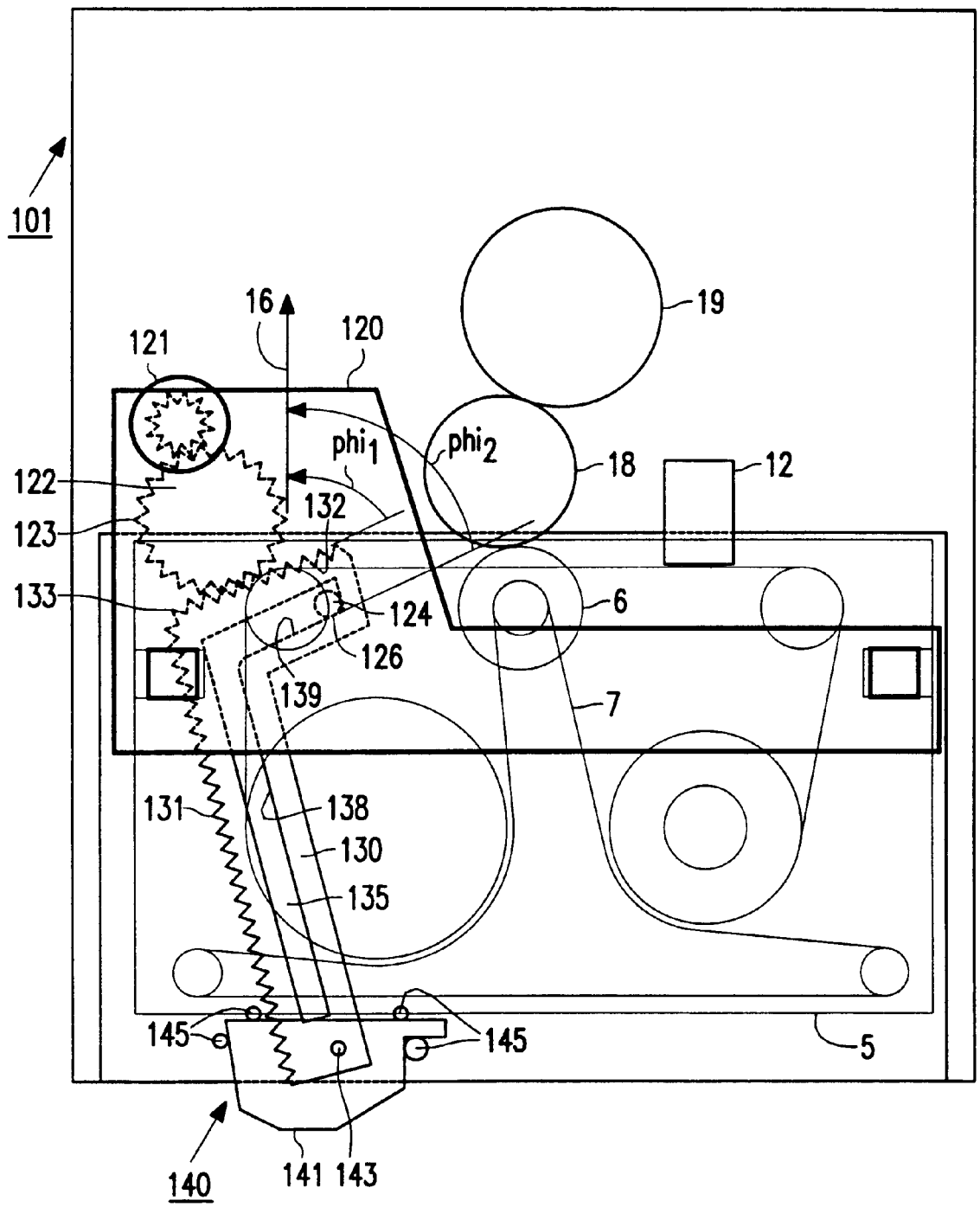
FIG. 3 is a diagrammatic plan view of this embodiment, the gripper being shown in an operational position.

FIG. 3 is a diagrammatic plan view of the apparatus 101, the cartridge 5 and the gripper 120 being shown in the operational position. In the operational position the magnetic head 12 is in contact with a magnetic tape 2 and the drive roller 18 is in contact with a drivable roller 6 of the cartridge 5. This drivable roller 6 drives a flexible endless belt 7, which in its turn drives tape reels 8 and 9, as a result of which the magnetic tape 2 is moved past the head 12. In the situation shown in FIG. 3 the teeth 123 of the wheel 122 are in mesh with the second part 132 of the teeth 133 and the element 130 has been rotated about the pin 143 with respect to the situation shown in FIG. 2. The second part 132 of the teeth 133 is disposed at an acute angle $phi_2$ with respect to the inward direction 16. As a result of this, a given rotation of the wheel 122 corresponds to a smaller movement of the gripper 120 in the inward direction 16 than in the case that the wheel 122 is in mesh with the first part 131 of the teeth 133. If the motor 122 is driven with a constant speed this results in the cartridge 5 being drawn into apparatus with a comparatively high speed, starting from the situation shown in FIG. 2, after which it is moved into the operational position with a comparatively low speed when the wheel 122 comes into mesh with the second part of the teeth 132. The second part of the teeth 132 in fact provides another transmission ratio between the motor 121 and the movement of the gripper 120.

The surface 126 of the pin 124 on the gripper 120 cooperates with a surface 139 bounding a slot in the element 130. This enables a substantial force to be exerted on the gripper 120 via the pin 124 without any large normal forces being produced on the contact surface 123 of the wheel 122. By making the angle $phi_2$ for example 70°, it is achieved that the mechanism for moving the gripper 120 is self-braking. For said value of the angle $phi_2$ it appears that the forces exerted on the gripper 120 by the drive roller 18 and the head 12 via the cartridge 5 do not result in a movement of the gripper 120. In the case that the apparatus 101 is defective in such a way that the motor 121 can no longer be energized, a user will nevertheless wish to remove the cartridge 5 from the apparatus, for example, before having the apparatus repaired. For this purpose the apparatus 101 comprises a mechanism by means of which the gripper 120 can be moved from the operational position to the loading position as shown in FIG. 4.

Figure 4:
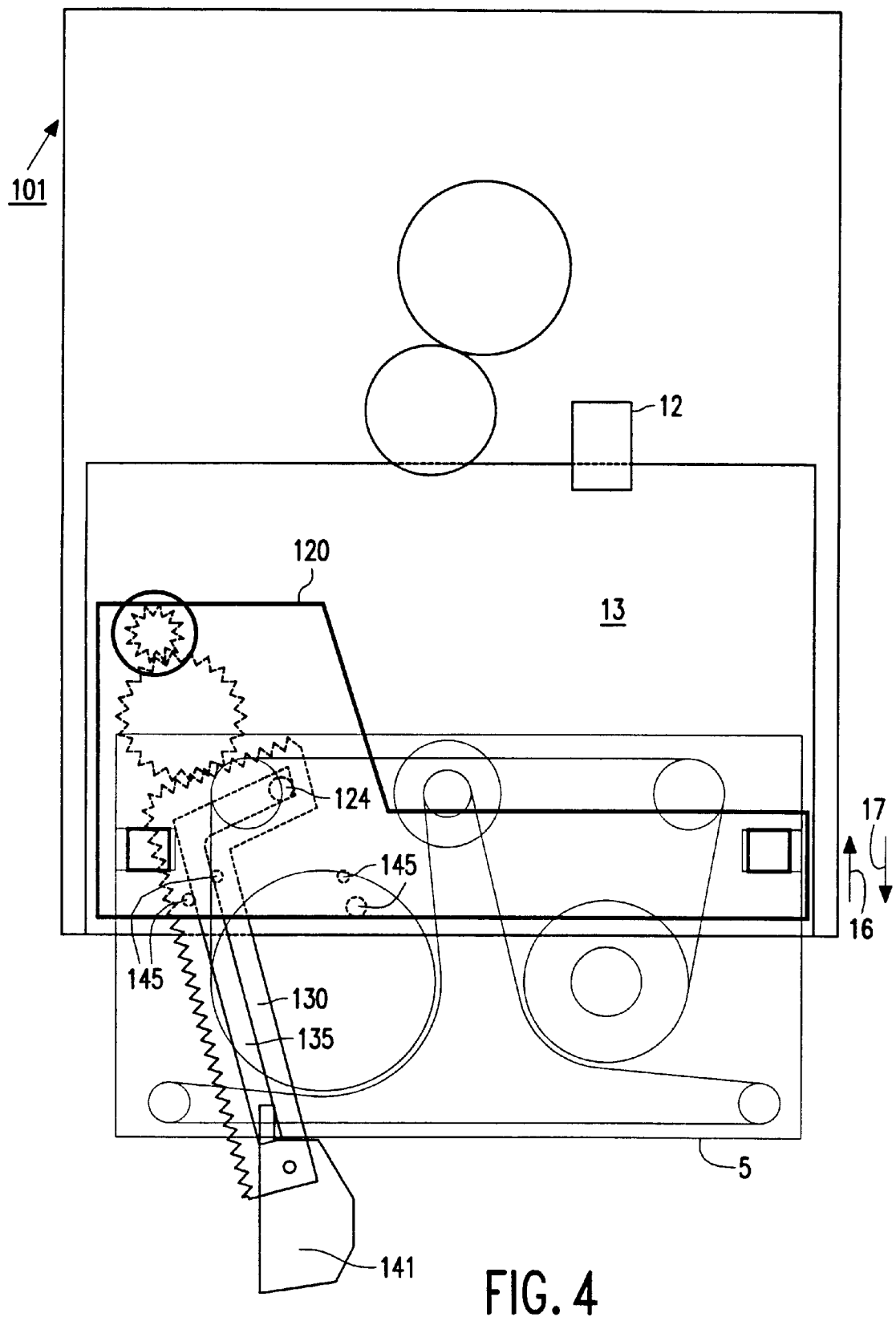
FIG. 4 is a diagrammatic plan view of this embodiment, in which the gripper has been moved to the loading position by hand.

FIG. 4 shows the apparatus 101 in a situation in which the gripper 120 with the cartridge 5 have been moved into the loading position by hand. This situation is obtained by pulling the handle 141 in the situation illustrated in FIG. 3. The handle 141 is then disengaged from the pins 145, as a result of which the element 130 can be pulled partly out of the apparatus 101. The gripper 120 with the cartridge 5 is then moved to the loading position in that the pin 124, which is secured to the gripper 120, engages the slot 135 in the element 130. In this way a user can remove the cartridge 5 from the apparatus to save the information, even if the electrical part of the apparatus does not function. Preferably, the handle 141 is countersunk in the front of the apparatus, so that a paper-clip or fingernail is needed to swing up the handle.

Figure 5:
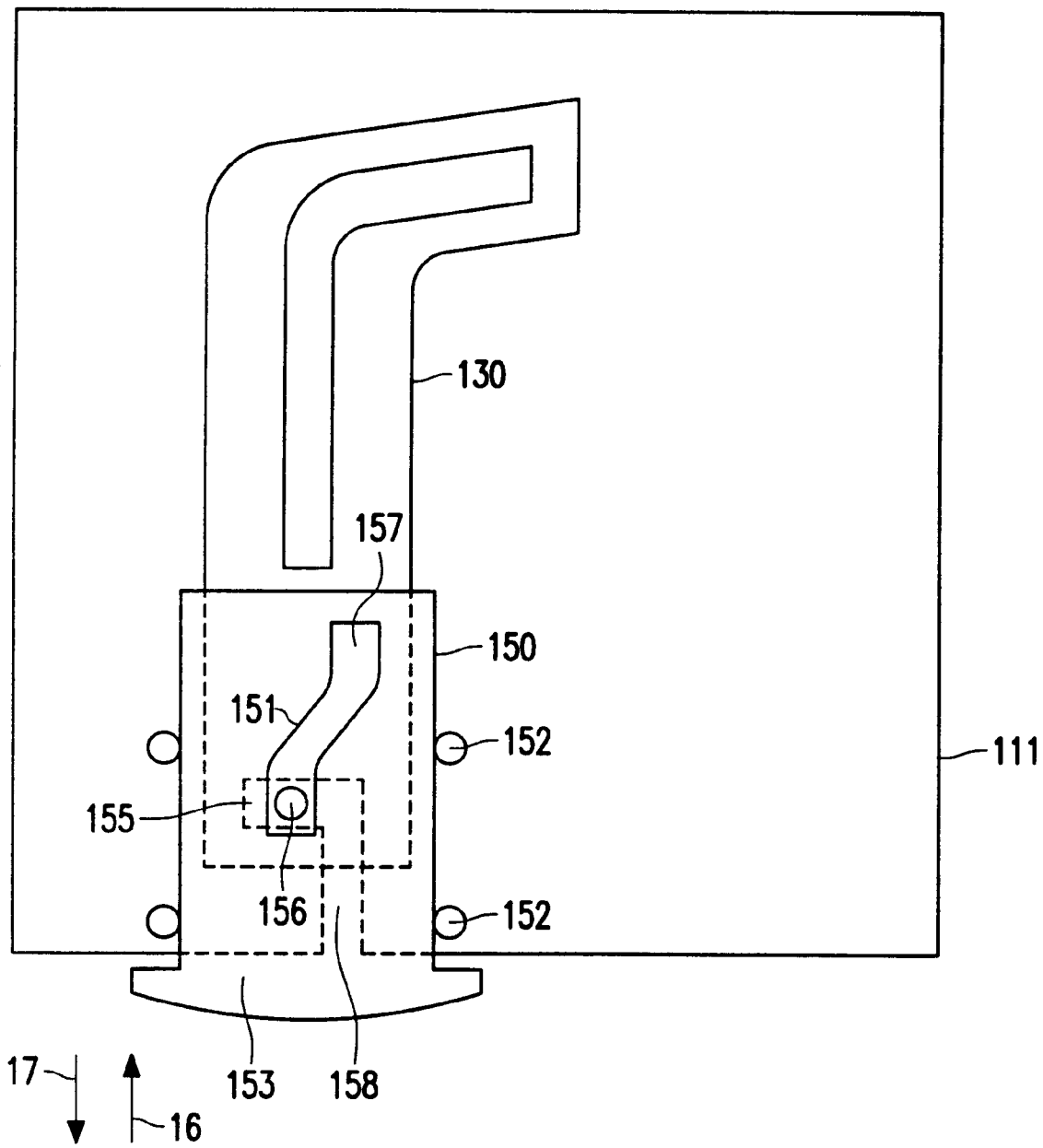
FIG. 5 shows an example of the coupling means.

FIG. 5 shows an alternative for the coupling means. The chassis 111 has a first slot 155, in which a pin is positioned by means of a second slot 157 in a slide 150. The pin 156 is secured to the element 130, as a result of which the element 130 is pivotably coupled to the chassis 111 and at the same time the element 130 is locked against movement in the outward direction 17. The slide 150 is guided by pins 152 mounted on the chassis 111. The slide can be moved in the outward direction 17 by pulling the handle 153. During such a movement the guide surface 151 will push the pin 156 out of the slot 155 into the slot 158, in which position the element 130 can be moved in the outward direction 17 by continuing to pull the handle 153. The advantage of this construction is that large forces can be exerted on the element 130 in the inward direction 16 or the outward direction 17 without the element 130 being moved relative to the chassis 111. Another advantage is that the position of the element 130 relative to the chassis 111 is accurately defined.

It is to be noted that the invention is not limited to an apparatus as described above. The invention can be used with similar advantages in an apparatus for the storage and/or reproduction of information on/from a disc-shaped information carrier in a cartridge. Moreover, other constructions of the first mechanism are possible. For example, the element 130 can be coupled non-pivotably to the chassis 111, the motor 121 and/or the wheel 122 being connected to the gripper 120 in such a manner that they are movable in a direction perpendicular to the inward direction 16, so that the wheel 122 can follow the second teeth 132. Besides, it is also possible to construct the second part of the second contact surface and the fourth part of the third contact surface as a cylindrical segment or another curved surface instead of as a flat surface, the tangent to this curved surface being inclined at an angle between 45 and 90 degrees relative to the inward direction.

I claim:

1. An apparatus for the storage and/or reproduction in information on/from an information carrier accommodated in a cartridge, which apparatus comprises:
   a chassis,
   a drive member for diving the information carrier via a drivable member of the cartridge,
   a cartridge space for receiving a cartridge, which cartridge space is accessible via an opening in a wall of the apparatus,
   a movable gripper arraigned in the cartridge space and adapted to grip the cartridge, and
   a loading mechanism comprising an electric motor and a wheel drivable by the motor, which wheel has a first contact surface which cooperates with a second contact surface,
   said second contact surface forming part of an element rotatable mounted in said chassis, said gripper having a pin for positioning said element for cooperation of said first and second contact surface, said element for moving the gripper linearly in an inward direction from a loading position, in which the cartridge can be inserted, into an operational position, in which the cartridge can be inserted, into an operation position, in which the information carrier can cooperate with the drive member, and for moving the gripper in an outward direction form the operational position to the loading position,
   the second contact surface includes a first part and a second part angled with respect to said first part said second part extending at a first angle between 45 and 90 degrees relative to the inward direction;
   whereby said motor moves said gripper for at least two different speeds and two different torque ratios.

2. An apparatus as claimed in claim 1, characterized in that the apparatus comprises coupling means adapted to couple the element pivotably to the chassis or the gripper.

3. An apparatus as claimed in claim 2, characterized in that
   the apparatus comprises an unloading mechanism adapted to move the gripper in an outward direction from the operational position to the loading position without the motor being energized, and
   the unloading mechanism comprises coupling means adapted to selectively couple the element and the chassis.

4. An apparatus as claimed in claim 2, characterized in that
   the element comprises a third contact surface having a third part which extends in the inward direction and having a fourth part which extends at a second angle between 45 and 90 degrees relative to the inward direction, and
   the gripper comprises a fourth contact surface which cooperates with the third contact surface.

5. An apparatus as claimed in claim 4, characterized in that the electric motor is mounted on the gripper and the element is coupled to the chassis.

6. An apparatus as claimed in claim 5, characterized in that
   the coupling means comprise a slide, which slide has a guide surface which cooperates with the element to move the element from a position in which the element is locked against movement in the outward direction relative to the chassis to a position in which the element is movable in the outward direction, and
   the apparatus comprises a handle for actuating the slide.

7. An apparatus as claimed in claim 2, characterized in that the first contact surface has first teeth, the second contact surface has second teeth and the first teeth are in mesh with the second teeth.

8. An apparatus as claimed in claim 2, characterized in that the electric motor is mounted on the gripper and the element is coupled to the chassis.

9. An apparatus as claimed in claim 8, characterized in that
   the coupling means comprise a slide, which slide has a guide surface which cooperates with the element to move the element from a position in which the element is locked against movement in the outward direction relative to the chassis to a position in which the element is movable in the outward direction, and the apparatus comprises a handle for actuating the slide.

10. An apparatus as claimed in claim 1, characterized in that the element comprises a third contact surface having a third part which extends in the inward direction and having a fourth part which extends at a second angle between 45 and 90 degrees relative to the inward direction, and the gripper comprises a fourth contact surface which cooperates with the third contact surface.

11. An apparatus as claimed in claim 10, characterized in that the first contact surface has first teeth, the second contact surface has second teeth and the first teeth are in mesh with the second teeth.

12. An apparatus as claimed in claim 10, characterized in that the fourth contact surface forms part of a pin secured to the gripper or the chassis.

13. An apparatus as claimed in claim 12, characterized in that said first and second angles lie between 60 and 70 degrees.

14. An apparatus as claimed in claim 12, characterized in that the first contact surface has first teeth, the second contact surface has second teeth and the first teeth are in mesh with the second teeth.

15. An apparatus as claimed in claim 12, characterized in that the electric motor is mounted on the gripper and the element is coupled to the chassis.

16. An apparatus as claimed in claim 10, characterized in that said first and second angles lie between 60 and 70 degrees.

17. An apparatus as claimed in claim 1, characterized in that the first contact surface has first teeth, the second contact surface has second teeth and the first teeth are in mesh with the second teeth.

18. An apparatus as claimed in claim 1, characterized in that the electric motor is mounted on the gripper and the element is coupled to the chassis.

19. An apparatus as claimed in claim 18, characterized in that the coupling means comprise a slide, which slide has a guide surface which cooperates with the element to move the element from a position in which the element is locked against movement in the outward direction relative to the chassis to a position in which the element is movable in the outward direction, and the apparatus comprises a handle for actuating the slide.

20. A system for recording and/or reproducing information, comprising an apparatus as claimed in claim 1 and a cartridge which accommodates an information carrier.

* * * * *